Aug. 31, 1926.
J. W. MYERS
1,597,815
STEERING WHEEL FOR BICYCLES
Filed April 2, 1926
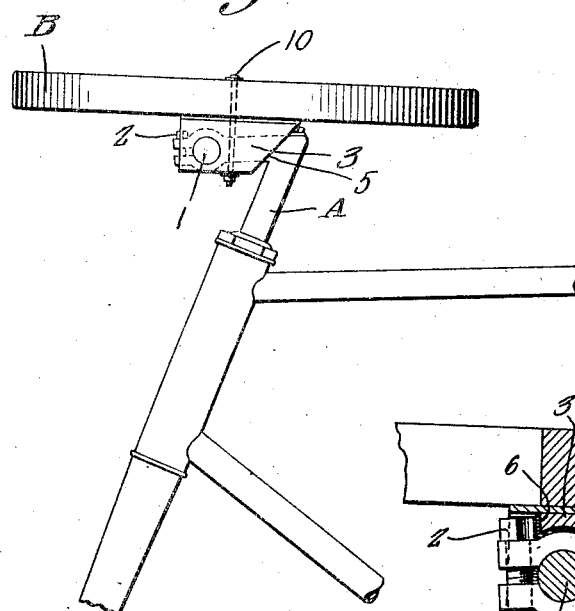
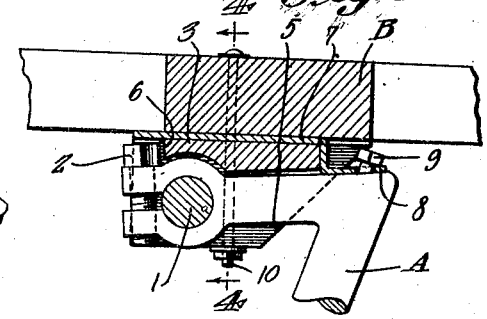
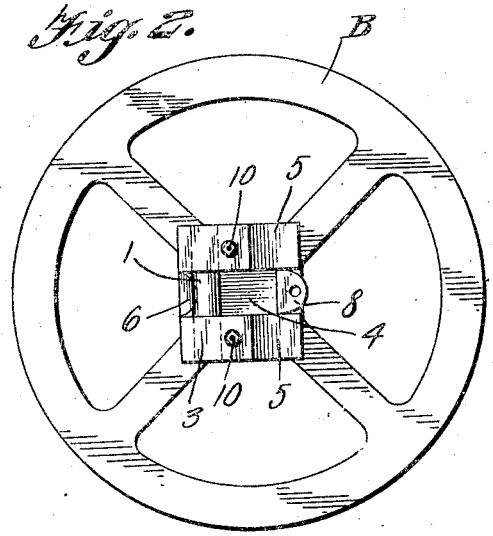
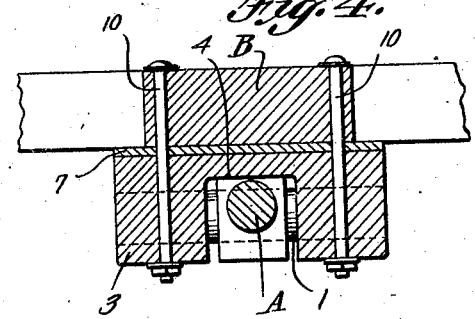
J. W. Myers,
INVENTOR
BY Victor J. Evans
ATTORNEY
WITNESS:

Patented Aug. 31, 1926.

1,597,815

UNITED STATES PATENT OFFICE.

JAMES W. MYERS, OF SOUTH RICHMOND, VIRGINIA.

STEERING WHEEL FOR BICYCLES.

Application filed April 2, 1926. Serial No. 99,340.

The object of this invention is to provide means for attaching a steering wheel to the steering post of a bicycle, after removing the handle bars, so that the bicycle can be steered through means of a wheel instead of the handle bars.

Another object of the invention is to provide novel means for fastening the wheel to the steering post.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a fragmentary elevation showing the invention attached to the steering post of a bicycle.

Figure 2 is a bottom plan view of the steering wheel with the means for attaching it to the steering post.

Figure 3 is a sectional view showing the wheel attached to the steering post.

Figure 4 is a section on line 4—4 of Figure 3.

As shown in these views, I remove the handle bars from the steering post A of the bicycle and substitute for said handle bar a short bar 1 which is held in place in the split end of the horizontal part of the steering post by the bolt 2. This short bar 1 is carried by a block 3 which is provided with a recess 4 in its center for receiving the horizontal part of the steering post. The parts on each side of the recess are provided with holes for receiving the ends of the bar 1. The rear end of the block is beveled, as at 5, and its front end is cut away, as at 6, to form a space for the head of the bolt 2.

A plate 7 rests on the top of the block and has a downwardly offset rear part 8 which is perforated to receive the bolt 9 which is carried at the top of the steering post. Long bolts 10 pass through the block and plate and through the hub part of the steering wheel B for fastening the wheel to the block and plate, the plate being fastened to the steeringing post by the bolt 9 and the block being fastened to the steering post by the bar 1. Thus the steering wheel is fastened to the steering post so that a turning movement of the wheel will be imparted to the post.

With this arrangement, a bicycle can be steered in the same manner as a motor vehicle and the attachment can be easily put in place on wheels by simply removing the handle bar and substituting the attachment.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a bicycle, a block having a recess for receiving the horizontal part of the steering post of the bicycle, a cross bar carried by the block and clamped to said horizontal part by the handle bar clamping means, a steering wheel and means for fastening the same to the block.

2. In a bicycle, a block having a recess for receiving the horizontal part of the steering post of the bicycle, a cross bar carried by the block and clamped to said horizontal part by the handle bar clamping means, a plate resting on the block and having an offset rear part fastened to the top of the steering post and a steering wheel bolted to the block and plate.

In testimony whereof I affix my signature.

JAMES W. MYERS.